W. HEBDON.

Rotary Cloth-Measures.

No. 6,437. Reissued May 18, 1875.

Attest:

C. F. Brown

Saml. M. Barton

Inventor:

William Hebdon

UNITED STATES PATENT OFFICE.

WILLIAM HEBDON, OF BOSTON, MASSACHUSETTS, ASSIGNOR TO HIMSELF AND DANIEL POTTER.

IMPROVEMENT IN ROTARY CLOTH-MEASURES.

Specification forming part of Letters Patent No. 146,337, dated January 13, 1874; reissue No. 6,437, dated May 18, 1875; application filed April 20, 1875.

*To all whom it may concern:*

Be it known that I, WILLIAM HEBDON, of Boston, in the county of Suffolk and State of Massachusetts, have invented certain new and useful Improvements in Rotary Cloth-Measures; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
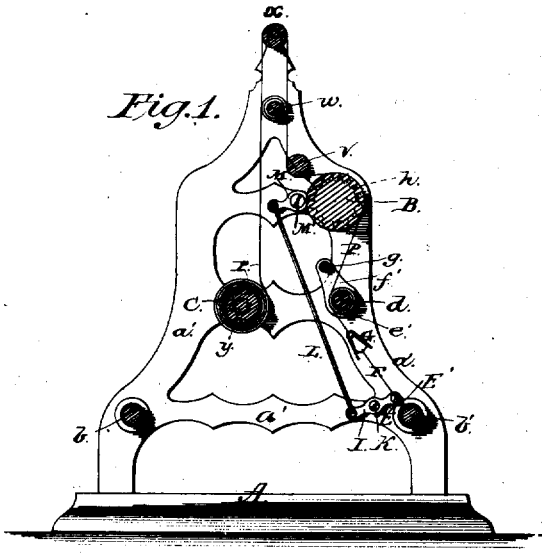
Figure 2:
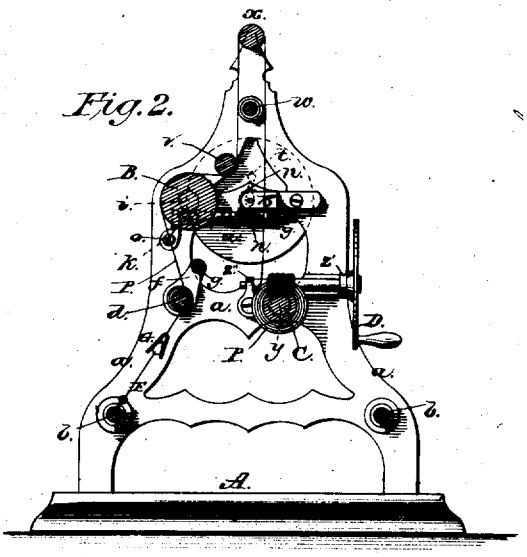
Figure 3:
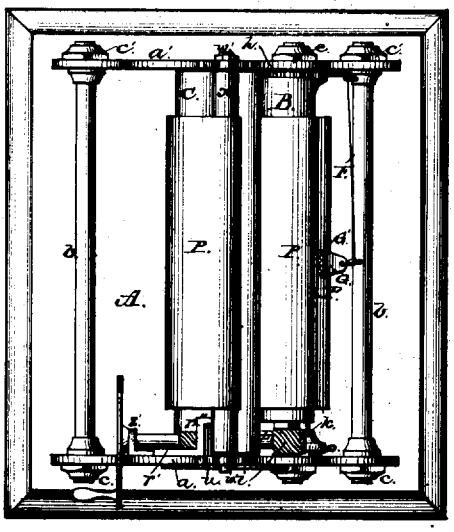
Figure 4:
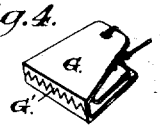
Figure 5:
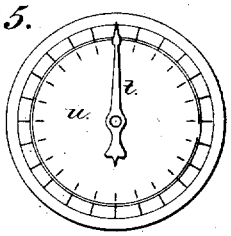

Figures 1 and 2 are central vertical transverse sections, looking at opposite sides, of my improved machine. Fig. 3 is a top view, and Figs. 4 and 5 are, respectively, a perspective and front view, of parts in detail of said machine.

This invention is an improvement on my patent for cloth-measuring machine, dated May 18, 1869, No. 90,262; and has for its object to perfect the arrangement and operation of the machine. To this end my improvements consist in certain devices for regulating the tension of the cloth, so as to vary the tension with the thickness of the cloth, and for checking the progress of the cloth as it approaches its termination, all of which I will now proceed to describe, in connection with the other parts operating in connection therewith.

In the drawings, A represents a platform, to which are secured the sides *a a'* of the machine, at the lower portion of the front and rear of which are transverse rods *b b'*, whose ends extend through the sides *a a'*, and are secured to the frame by screw-nuts *c c'*. Above the rod *b* is a guide-rod, *d*, held to the sides *a a'* by screw-nuts *e*, and formed on the inside, near the ends, with collars *e'*, between which and the sides *a a'* are located arms *f f'*, adapted to turn on the rod *d*, and be held in any desired position by means of the screw-nuts *e*. The upper ends of the arms *f f'* receive the ends of a rod, *g*, which is thus allowed to be adjusted upward and downward, to accommodate the reception of material of different thickness. Above the rod *d* is located a transverse receiving-roller, B, of a sufficient length to receive goods of six-fourth width, and whose axle turns in the sides *a a'*, and is provided on the inside of the frame, at one end, with a cog or ratchet wheel, *h*, and at the other end with a screw-pinion, *i*, formed with diagonally-curved threads or teeth, that mesh with the diagonally-curved teeth or threads of a similar pinion, *k*, operating at right angles to the pinion *i*, and formed on or attached to the end of an arbor, *l*, which is provided with a pinion, *m*, having concentric threads that mesh with a pinion, *n*, operating at right angles with the pinion *m*, and whose concentric teeth are slightly curved on the edge in a concave form. One end of the arbor *l* of the pinion *m* is supported by and turns in a bearing, *o*, attached to and projecting from the inside of the side *a*, and the other end of the arbor *l* turns in a bearing, *q*, depending from a bearing, *r*, formed with two right-angled horizontally-projecting arms, *r' r''*, one of which is attached to the side *a*, and the other supports and allows the turning of one end of the arbor *s* of the pinion *n*. The other end of the arbor *s* extends through the side *a*, and connects with an index-hand, *t*, which, by the rotation of the roller B that operates the pinion *i*, and consequently the pinions *k*, *m*, and *n*, is carried around a dial-plate, *u*, Fig. 5, said dial-plate being properly marked to indicate the number of yards, &c., of the goods passing over the roller B. Above the roller B is a guide-roller, *v*, whose axle turns in the sides *a a'*, and above this roller is a central stay-rod or guide, *w*, held to the sides *a a'* by screw-nuts *w'*. At the top of the frame is a central guide-roller, *x*, whose axle turns in the apex of the sides *a a'* of the frame.

Forward of the center of the frame and at a suitable distance from the platform A is located a transverse winding-roller, C, of a sufficient length to receive the width of a single piece of six-fourth goods, or of the open width of two pieces of three-fourth goods, and whose axle is supported and turns in the sides *a a'*, one end of the axle on the inside of the frame being provided with a screw-pinion *y* having diagonally-curved threads or teeth that mesh with the teeth of a pinion, *z*, arranged at right angles with the pinion *y*, whose arbor $y'$ is supported and turns in bearing $z'$ $z''$ attached to the side $a$, its outer end extending through the bearings $z'$ and connecting with a crank, D. The rod $b'$ is provided near the center, and one end with staples E E′, or may be otherwise arranged to receive a cord or wire, &c., F, one end of which is attached to a spring-clutch, G, formed (as shown in Fig. 5) in two portions, extending from each other toward the rear, and connected by a bent spring, H, the forward end of each portion being formed with an inwardly-projecting lip having a serrated edge or teeth, G′.

This clutch may be made in any suitable form, so as to be engaged with and hold, or be detached from and release, one end of the strip of goods P. The other end of the cord or wire F is attached to one end of an arm, I, pivoted at K, and to the other end of which arm I is attached the end of a rod or wire, L, whose other end is connected to one end of a pawl or brake, M, which is pivoted at M′, its other end engaging with the ratchet-wheel $h$ of the roller B, which is stopped in its rotation when the cloth has reached its termination, by means of the clutch G operating on the string or wire F. The latter is of such a length that when the end of the material has reached the desired position the tension of the string or wire F actuates the arm I, which by means of the wire or rod L brings the pawl or brake M in contact with the teeth of the ratchet $h$, so as to hold the roller B and prevent the slipping over of the cloth, and stop the index-hand $t$, which indicates on the dial $u$ the number of yards, &c., passed over the machine.

A wire or other netting may be arranged at the bottom of the machine to protect the goods and prevent their dragging on the platform or floor.

It will be readily seen that one end of the cloth being carried up between the guide-rods $d$ and $g$, (the latter of which is readily adjusted by means of the arms $f f'$ turning on the rod $g$ to materials of different thicknesses,) it is brought to the top of the receiving-roller B, when the index $t$ is turned by the operator to the head-point of the dial $u$. The material is then put under the roller $v$ and brought over the top roller $x$, and carried down and connected with the winding-roller C, which being rotated feeds along the material, the latter in its passage operating the gear mechanism, so as to carry the index $t$ around the dial $u$ and accurately indicate the number of yards measured, the index being stopped when the end of the cloth is reached by the action of the brake M on the roller B, as above described.

By my improved arrangement material of any thickness may be readily operated without the expense of time and labor heretofore required in adjusting the tension-regulators to material of various thickness.

I claim as my invention—

1. In a machine for measuring and examining cloth, &c., a spring-clutch, G, adapted to hold one end of the cloth, and connected with so as to operate a brake or pawl, M, and stop the roller B and index $t$, when the end of the cloth has reached the desired position, substantially as described.

2. In a machine for measuring and examining cloth, &c., an adjustable rod, $g$, provided with arms $f f'$ turning on said rod, and held or released by screw-nuts $e$, substantially as and for the purpose specified.

In testimony that I claim the foregoing I have hereunto set my hand this 8th day of April, 1875.

WILLIAM HEBDON.

Witnesses:
C. F. BROWN,
SAML. M. BARTON.